Sept. 20, 1966 J. H. EDE ETAL 3,273,450

DATA PROCESSING APPARATUS

Filed Nov. 15, 1963 7 Sheets-Sheet 1

INVENTORS
John Helmut Ede
Albert Stanley Pratt
Brian Constantine Sewell
By Pierce Scheffler & Parker
Attorneys INVENTORS
John Helmut Ede
Albert Stanley Pratt
Brian Constantine Sewell
By Prince, Scheffler & Parker
Attorneys INVENTORS
John Helmut Ede
Albert Stanley Pratt
Brian Constantine Sewell
By Pierce, Scheffler & Parker
Attorneys

DATA PROCESSING APPARATUS

INVENTORS
John Helmut Ede
Albert Stanley Pratt
Brian Constantine Sewell
By Pierce, Scheffler & Parker
Attorneys Sept. 20, 1966 J. H. EDE ETAL 3,273,450

DATA PROCESSING APPARATUS

Filed Nov. 15, 1963 7 Sheets-Sheet 5

INVENTORS
John Helmut Ede
Albert Stanley Pratt
Brian Constantine Sewell
By Pierce, Scheffler & Parker
Attorneys INVENTORS
John Helmut Ede
Albert Stanley Pratt
Brian Constantine Sewell
By Pierce Scheffler & Parker
Attorneys Sept. 20, 1966 J. H. EDE ETAL 3,273,450

DATA PROCESSING APPARATUS

Filed Nov. 15, 1963 7 Sheets-Sheet 7

INVENTORS
John Helmut Ede
Albert Stanley Pratt
Brian Constantine Sewell
By Pierce Scheffler & Parker
attorneys

United States Patent Office 3,273,450

Patented Sept. 20, 1966

3,273,450
DATA PROCESSING APPARATUS

John Helmut Ede, Feltham, Middlesex, Albert S. Pratt, Churchdown, and Brian Constantine Sewell, Teddington, Middlesex, England, assignors, by mesne assignments, to The Rank Organisation Ltd., London, England, a British company Filed Nov. 15, 1963, Ser. No. 324,086
Claims priority, application Great Britain, Nov. 20, 1962, 43,888/62
4 Claims. (Cl. 88—24)

This invention relates to data processing apparatus, and is concerned especially, but not exclusively, with an apparatus and method for obtaining rapid access by optical means to data stored on photographic film in an electronic computer output printer, said data when located being used for optical projection in the electronic computer output printer.

Various proposals have been made for gaining rapid access to data stored, for example, on a reel of magnetic tape, but these proposals suffer from the drawback that they are not applicable when it is desired to gain rapid access to data by optical means.

It is an object of the present invention to overcome this drawback.

According to one aspect of the present invention, there is provided apparatus for gaining access by optical means to predetermined data stored on a light and flexible data bearing member provided with optically distinguishable position marks, comprising means for guiding said data bearing member, means for coarse positioning and means for subsequent fine positioning of said data bearing member in accordance with said marks.

According to a further aspect of the present invention there is provided a method of gaining access by optical means to data stored on a light and flexible data bearing member, comprising the steps of providing said data bearing member with optically distinguishable position marks, and coarse positioning said data bearing member and subsequently fine positioning said data member in accordance with said marks.

The invention includes a light and flexible data bearing member, such as a photographic film, for use in the apparatus or method according to the present invention, comprising a plurality of tracks bearing coarse positioning and fine positioning marks associated with the data stored on said data bearing member.

In order to make the invention clearly understood, reference will now be made to the accompanying diagrammatic drawings which are given by way of example and in which.

Figures 1, 2:
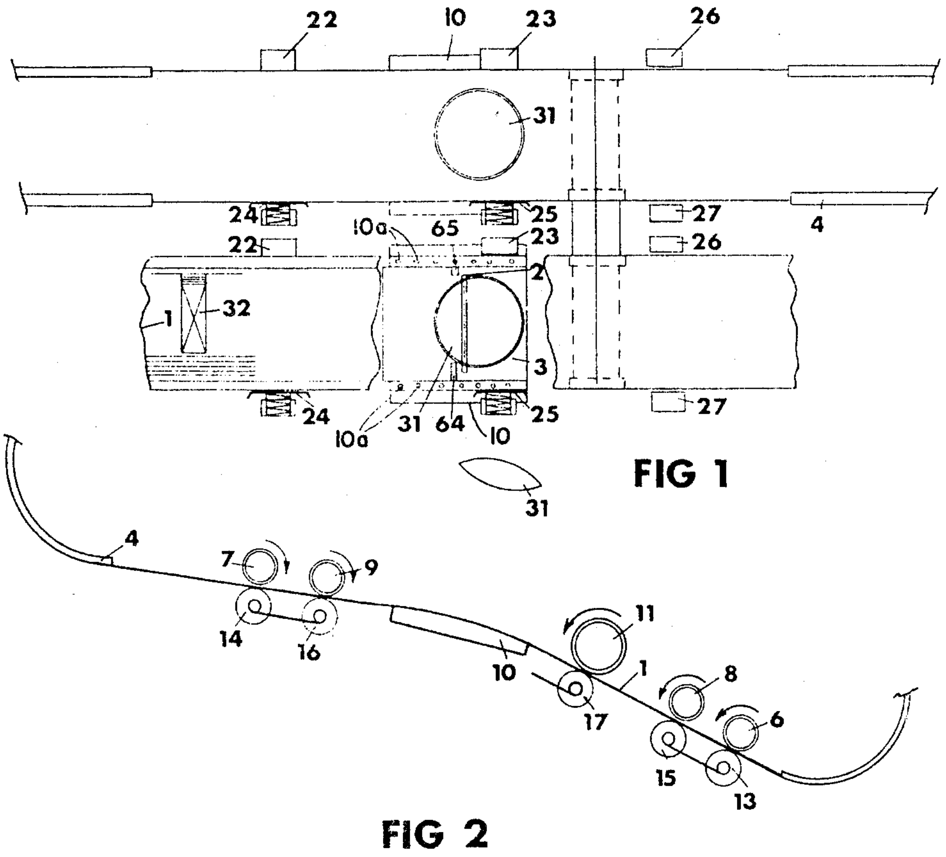
FIGURE 1 is a plan view of an apparatus for gaining access by optical means to predetermined data stored on a flexible film provided with optically distinguishable markings.
FIGURE 2 is a side view of the apparatus of FIGURE 1.

The apparatus for gaining access rapidly to data stored on a light and flexible data bearing member in the form of a film comprises two tracks, arranged in parallel, each having its own means for positioning and scanning the film. Thus, while one film is being scanned, predetermined data on the other film is moved into position in such a way that it is ready for scanning immediately after scanning of the predetermined data on the first film has been completed. Each film is provided with data in the shape of forms, for example, motor insurance policy forms, to be scanned by a projection arrangement, and it is a function of the apparatus according to the present invention to enable a predetermined form to be placed in position ready for scanning in as short a time as possible. The apparatus forms part of a printing apparatus for printing information supplied to it by a computer on selected forms and gaining access to each form rapidly, as it is important to keep pace with other data emerging from the output of the computer. The film drive and film guidance mechanism will first be described followed by a description of the film itself. The optical system for the illumination and projection of a form after it has been located and positioned in place ready for scanning will then be described followed by a description of the operation of the apparatus. Only one track of the apparatus will be described, it being understood that both tracks are identical.

The film 1 is arranged to be guided in a form-head over an aperture slit 2 in a curved aperture plate 3 on a film gate 10 by means of film chutes which are curved in order to impart structural rigidity to the film to resist buckling. Tracks are provided near both edges of the film for driving the film by means of friction. Movement of the film is effected by five rotatable rollers, each having a different function. A first roller 6 is provided for moving the film 1 forward at an appreciable speed, and is referred to as a fast forward drive roller, while a corresponding roller 7 provides for fast reverse drive. A further roller 8 enables the film to be moved forward slowly, and is referred to as a slow drive roller, while a corresponding roller 9 enables the film to be moved slowly backwards. A fifth roller 11, somewhat larger in diameter than the other rollers, is provided for very slow movement of the film during the scanning operation. The fast drive forward roller 6 and slow drive forward roller 8 are linked by a gearbox (not shown), and share the same motor, while the fast drive reverse roller 7 and slow drive reverse roller 9 are similarly actuated. The scan roller 11 is driven through a gearbox (not shown) from its own synchronous speed motor.

Figure 3:
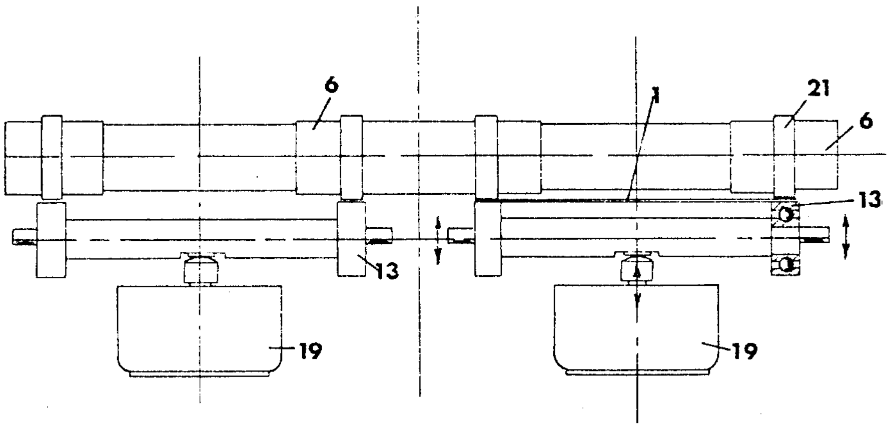
FIGURE 3 is an elevation view, to a larger scale than FIGURE 1, of a detail of a driving arrangement for the film.

Positioned under each of the drive rollers 6, 7, 8, 9 and 11 is a pinch roller 13, 14, 15, 16 and 17 respectively, each suspended on leaf spring ligaments 18 and operated by a centrally positioned solenoid 19 (see FIGURE 3). On energising one of the solenoids, the respective pinch roller forces the film against friction bands 21 on the drive roller in question, thus, causing the film 1, after a very short acceleration period, to move at the surface speed of the respective drive roller.

Lateral registration of the film especially while being scanned, has to be a very high order of accuracy, since any deviation in lateral position is considerably magnified when considered in terms of the projected optical image. To achieve the required lateral registration and guiding of the film each solenoid 19 is centrally positioned in relation to its allocated pinch roller, thus applying equal pressure and therefore equal traction to both driving tracks of the film. Also, the diameters of the two friction bands 21 of a given drive roller are made equal, within very close tolerances, for symmetry, and the film is forced against fixed edge guides 22 and 23 in two places, by spring loaded pads 24 and 25, while another set of edges guides 26 and 27 provide a fixed gap, only slightly larger than the maximum width of film. These guides, together with the chutes 4 at each end of the mechanism ensure that the steering and lateral registration of the film is approximately correct, leaving the spring loaded pads 24 and 25 with only a small amount of work to do, to effect final registration.

The film 1 is made to follow a curved path at the scanning slit 2, and also in the chutes 4. This gives the film increased stiffness against lateral buckling, and thus permits the use of adequately large lateral pressure at those guiding points, which are most important.

The axis of each drive roller 6, 7, 8, 9 and 11 is set at right angles to the edge guiding faces defined by the guides 22, 23, 26 and 24, 25, 27 to a high order of accuracy, and the fixed side guides 22, 23, 26 and 27 have sapphires or other hard wear resisting materials as their working faces, to ensure that lateral registration is not lost due to wear.

Film guidance through the length of the formhead is by means of one of the drive rollers 6, 7, 8, 9, 11 and a corresponding one of the pinch rollers 13, 14, 15, 16, 17, the aperture plate 3 and the chutes 4. The curved aperture plate 3 gives rise to considerable friction. Therefore, to reduce wear and drag on the film 1 and also wear on the aperture plate 3, compressed air is supplied to the aperture plate surface when the fast drives are in operation, that is to say, an "air bearing" is provided. The scan drive roller 11 is so positioned that when it is actuated the film leaves the aperture plate tangentially. This ensures that the vacuum pull down which operates during slow drive and scanning is operative over the whole length of the aperture plate, yet keeping the torque required to scan the film to a minimum. The curved aperture plate 3 serves to keep lateral bending and buckling of the film to a minimum, so as to keep the photographic image at the scanning slit 2 suitably within the object plane of the projection lens 31.

The fast and slow forward drive rollers 6 and 8 are so positioned that the film pulls clear of the scan drive roller 11, when the fast or slow drive roller 6 or 8 is operated, thus reducing the risk of non-uniform wear of the scan roller 11.

Figure 4:
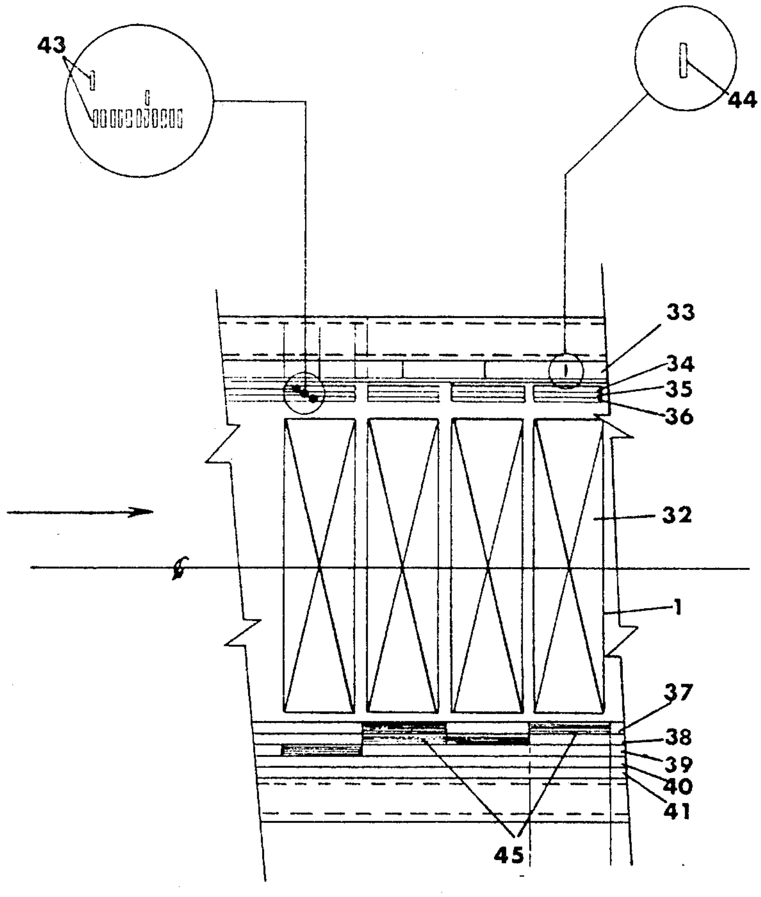
FIGURE 4 illustrates a fragment of the film.

The film 1 is a wide photographic film (see FIGURE 4), and is provided with micro images 32 of the forms to be scanned. Besides the micro image 32 of the forms to be projected and printed, there are nine tracks 33, 34, 35, 36, 37, 38, 39, 40 and 41 of optically distinguishable sensing marks. The marks are all sensed photoelectrically, and include timing marks 43 provided in tracks 34, 35 and 36, fine position marks 44 provided in track 33 and coarse position marks 45 provided in tracks 37 to 41.

Figure 8:
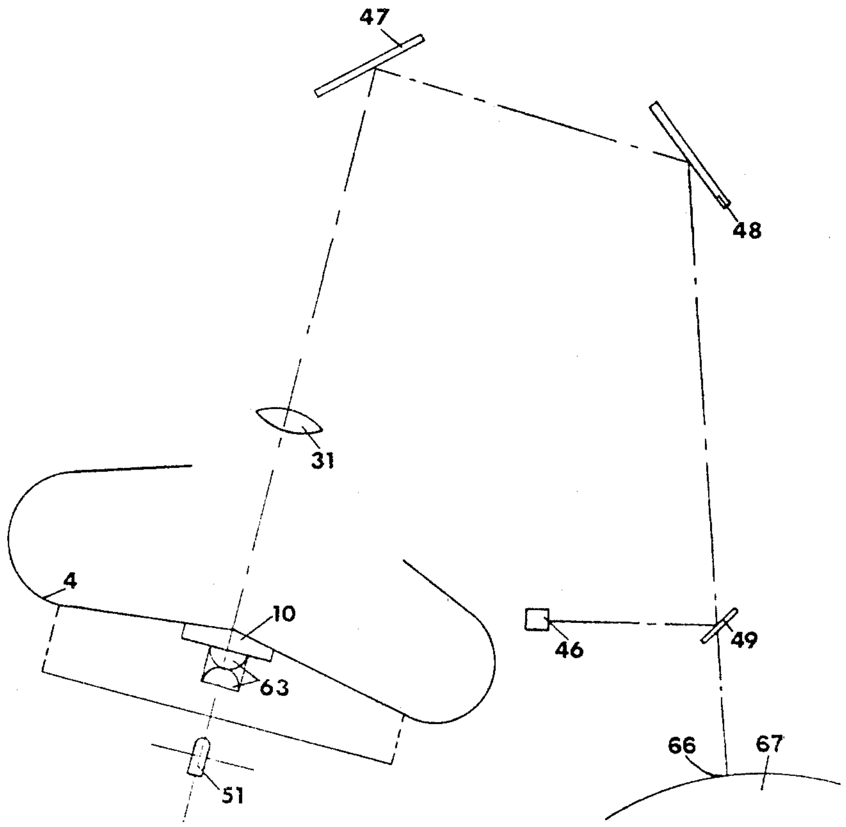
FIGURE 8 is a diagram showing the entire optical path in the apparatus.

The timing marks 43 are in the shape of thin transparent bars accurately positioned in relation to the form image 32 such that by means of a suitable apertured photocell 46 (see FIGURE 8) which is one of a plurality of photocells 46 disposed in a group, placed in the image plane, an electrical signal is obtained which bears a direct relationship to the position of the form image 32 in the scanning slit 2. Mirrors 47, 48 and 49 (see FIGURE 8) serve to reflect the timing marks onto the photocell 46.

There are three different tracks 34, 35 and 36 of timing marks, called respectively the line start track 36, the vertical tabulating track 35, and the form end track 34. The tracks 35 and 36 govern the timing of other parts of the printer, that is the registration and tabulation of the variable information to be printed on to the forms, while the track 34 indicates the end of a form and is used to initiate several actions of the mechanism. These are to close the shutter, disengage the scan drive, initiate repositioning of film ready for the next scan, and, in a certain mode of operation of the apparatus, initiate scan of the other film disposed in the other, parallel, film guide track.

The coarse position marks 45 provide a binary digital code for each form. Each track elements forms a binary "bit," by being made either opaque or transparent to light. For enabling 32 different forms to be used, five tracks 37 to 41 are used in order to give each form a discrete code. The code provides for consecutive numbering starting with 0 at one end and ending with 31 at the other end of the film. Each particular code extends over the pitch of the form which it represents.

The marks 45 are sensed by a bank of five of the photocells 46, which have tunnel-like apertures to avoid crosstalk.

The fine position mark 44 is similar to the form end mark 43 in the track 34, but extends over a somewhat greater width. It is positioned in each case at a fixed pitch from the beginning of the form image on the film. The main purpose for which the mark 44 is used, as the name implies, is to control the final position of the film 1 prior to the commencement of the scan. The mark 44 is also used to block the coarse position signal, thus avoiding ambiguity on changes of code.

The fine position mark 44 is sensed by one of the photocells 46 which has an aperture of such a width that irrespective of whether the forward or the reverse slow drive is used, the film 1 stops with sufficient accuracy in relation to the projection slit 2. This scheme is necessary because film momentum and general inertia in the system give rise to a time delay between the electrical sensing of the timing mark and the coming to rest of the film 1, that is to say if the mark will overshoot the leading edge of the aperture of the photocell by a distance of, say, $x$ inches, and if the delay of the film travelling in the other direction results in an overtravel of, say, $y$ inches, then, if the photocell aperture is made $y+x$ inches wide, the film will come to rest in the same place irrespective of the direction of film motion.

Figure 5:
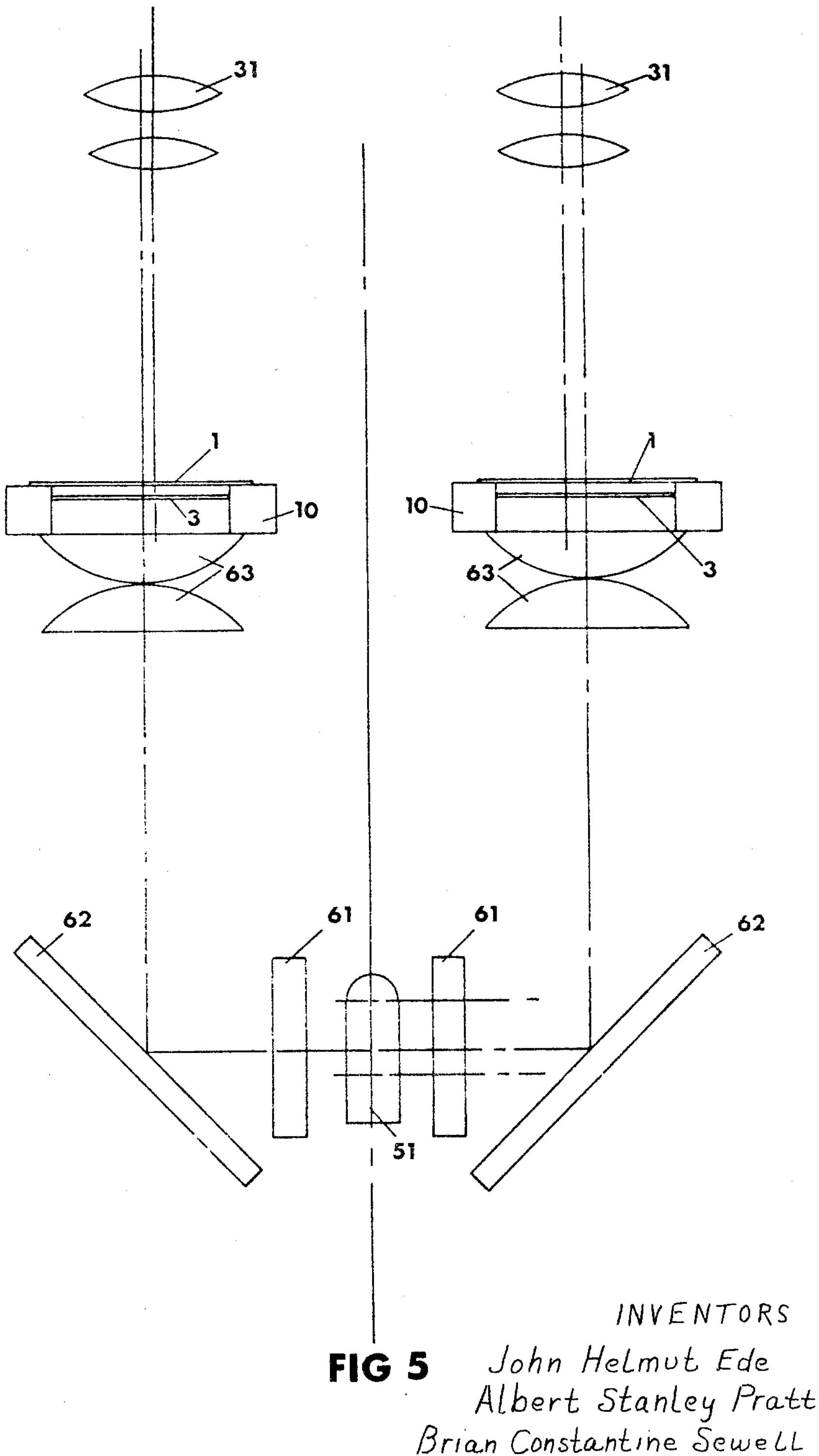
FIGURE 5 is a diagram of optical elements of the apparatus.

The appropriate form on the film, when positioned ready for scanning, is illuminated by a single 125 w. mercury vapour light source 51 (see FIGURE 5) operating at a frequency of 1.2 kc./s. to illuminate both sets of forms and all of their associated sensing marks. Since light from the first film must not reach the image plane while the second film is being scanned and vice versa, each aperture plate 3 has a rotatable shutter 52 (see FIGURE 6) disposed beneath the slit 2. The shutter 52 is mounted on a shaft 53 a region 54 of which is carried in a bearing in the film gate 10. The shaft 53 is rotatable for actuating the shutter, by a forked arm 55 fixed to the shaft 53 and engaged by a crank pin 56 of a rotary solenoid 57. However, while the form and the timing marks are shuttered, the coarse and fine position tracks must be illuminated. Because of this, and because film width must be kept to a minimum, the coarse and fine position marks are sensed at points off-set from the projection slit 2.

This off-setting is kept to a minimum, in order to keep the area which has to be illuminated to a minimum, and also to ensure that the fine position mark 44 can be as near to the beginning of its allocated form as possible.

The size of the projection slit 2 in the direction of scan is determined by the amount of total light flux required in the image plane, assuming a projection lens of optimum aperture. Too small a slit would make dust or other small foreign bodies a serious problem. Two large a slit would require very high orders of uniformity and synchronism of scan speed.

A condenser system (see FIGURE 5) used to illuminate the film provides for more magnification in one axis than in the axis at right angles to it. This is done to obtain maximum useful flux from the light source 51, which is a commercially available discharge lamp which has a discharge which is many times longer than it is wide. It will be noted that the optimum condition is to have the light source 51 in focus at the aperture, and just filling the aperture of the projection lens 31 together with uniform illumination of the whole object plane.

Cylindrical lenses 61 provide for magnification in one direction only. They are made from boro-silicate glass to withstand the great heat from the lamp. The mirrors 62 provide for folding of the light path, making the use of one common light source 51 possible. The pairs of convex spherical lenses 63 provide for a magnification equal in both directions and thus complete the condenser system.

Figure 6:
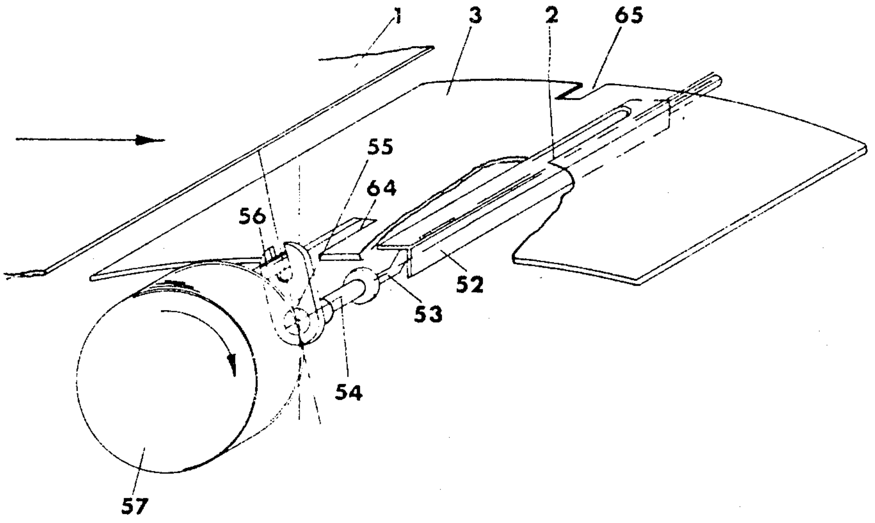
FIGURE 6 is a perspective view of an aperture plate of the apparatus and a shutter arrangement.

Because of the geometric configuration used, the rays of light filling coarse and fine position apertures 64 and 65, respectively, in the aperture plate 3, as shown in FIG. 6 are made up of light which has travelled through the whole condenser system and light which has bypassed the cylindrical lens 61 and the mirror 62, that is, light straight from the lamp 51 to the spherical condensers 63. To avoid cross-talk between the coarse position tracks, due to the widely diverging light rays, tunnels are fitted in front of the coarse sensing photocells 46 which select only those rays which diverge very little from each other, that is to say, those which have been through the complete condenser system.

The mercury vapour lamp 51 used is an efficient and compact source of high brightness and spectrum suitable for the xerographic process used in the printing operation. The use of other lamps, for example, incandescent lamps, is not, however, precluded. In the case of the mercury vapour lamp, advantage is taken of the fact that it may be operated at fairly high frequency, e.g. 1200 c.p.s., at which approximate frequency the light is modulated at 2400 c.p.s., but only by a certain percentage, so that the output may be detected photoelectrically by either D.C. or A.C. amplification. For reasons concerned with the drift of D.C. amplifiers, the preferred method is by A.C. amplification.

In order to project the data from the film, two separate projection lenses 31 are used, one for each track. The two mirrors 47 and 48, common to both tracks, are used to fold the projected beam, such that the image plane 66 is in the correct position in relation to the printer 67.

Since for convenience of engineering the optical path length of both tracks are the same, the focal lengths of the projection lenses 31 are matched to a high order of accuracy, to ensure correct magnification of the system associated with each track.

The shutter 52 which is disposed immediately under each projection slit 2 is adapted to operate with minimum movement, and therefore the inertia is very small. Hence the speed of operation is only dependent on the speed of operation of the rotary solenoid 57 which actuates it.

In considering the operation of the apparaus, it is assumed that film 1 on the first track is positioned ready for scanning, that is to say, the front of the relevant form is just outside the projection slit 2, and the film 1 on the other track is just at the end of scanning of a particular form. A scan start signal is now generated by a master timing pulse which opens the shutter and engages the scan drive. The film 1 begins to move and is up to scan speed by the time the front of the form passes into the scanning slit 2. In the image plane 66, the projected image moves at the same speed as the surface of the printing drum 67, so effecting the stationary image required on the drum 67 for the production of an electrostatic image. Simultaneously with the scanning of the form, the timing marks sweep past their respective photocells 46 in the image plane, thus generating the required timing pulses.

Just when the end of the form sweeps out of the slit 2, that is when it has been fully scanned, the form end mark sweeps past its photocell 46, thus generating a form end pulse. The form end pulse closes the shutter 52 and disengages the scan drive. It transfers the positioning control from one film to the other film, and initiates the positioning cycle.

Figure 7:
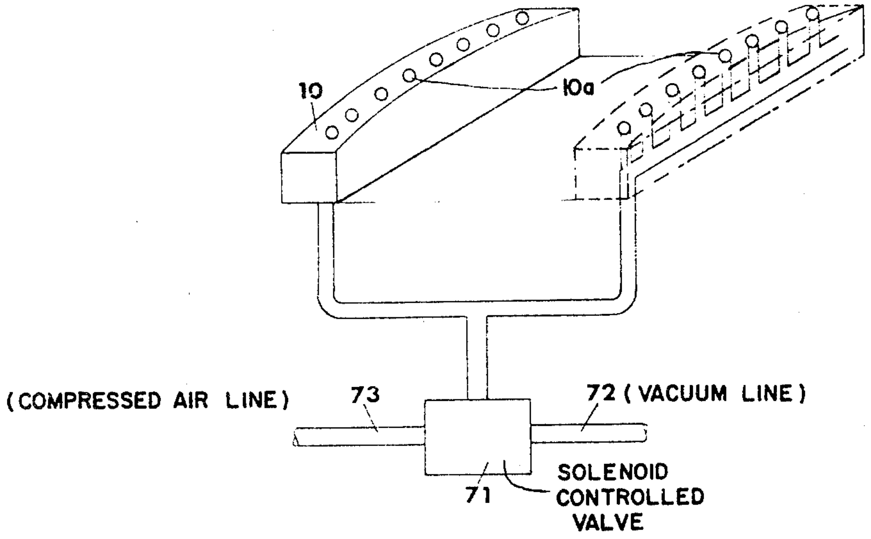
FIGURE 7 is a view illustrating a vacuum pressure system for film gates of the apparatus.

If the next form to be scanned is three form pitches or less away, only the slow drive is used, but if the next form to be scanned is more than three forms away, both the fast drive and slow drive are used. In the latter case the fast drive, which makes the film move in the correct direction toward the required form, is first engaged. Simultaneously a solenoid valve 71 (see FIGURE 7) is energised, switching the surfaces at the opposite sides of the corresponding film gate 10, which are ported at 10*a* and overlie the border portions of the film from a vacuum line 72 to a compressed air line 73, thus providing an air cushion for the film 1 to ride on. After an initial period of skidding and acceleration, the film 1 moves at high speed towards the chosen form. When within 3 forms of the required form, the fast drive 6 or 7 and the solenoid valve 71 are switched off, subsequently the slow drive 8 or 9 is engaged. Because of the high speed of the film and a short delay inherent in the pinch up mechanism 15 or 16, the slow drive 8 or 9 starts to decelerate the film when it is rather less than 3 forms from its final position. The vacuum suffers a somewhat greater delay than the slow drive before it becomes effective and pulls the film down onto the surface of the gate 10. At some period before the final position, the film 1 moves at the constant speed of the slow drive 8 or 9.

When the desired form is reached, the output from the coarse position photocells 46 is gated with the fine position output, such that when fine position is sensed the slow drive 8 or 9 is disengaged. Because of the low momentum of the film 1 and the friction at the aperture plate 3 and in the mechanism, the film comes to rest within a short distance of the limits required.

The film is now ready to commence another scan,

The operation of the apparatus is so arranged that while the one film is being scanned, the other film is being postioned. In this way one film can be scanned immediately the other film has been scanned.

While the apparatus and method according to the invention have been described in connection with their use in an electronic computer output printer, it will be appreciated that they may be employed in any application where rapid access by optical means to store data is required, for example, in a microfilm filing system.

It will be appreciated that many alternative constructions of the apparatus as hereinafter described are possible. To name but a few, the photographic film could be replaced by a film of different material provided with optically distinguishable marks, or could be a photographic film tracked with metal. It could alternatively be made of paper or any other light and flexible material. The film could be made much narrower to suit the size of the image to be projected and the degree of magnification of the optical system. Instead of using a curved gate it is possible to hold the film flat, and to scan the entire image by lens arrangements usual in the art, or the image could be statically projected by photographic means.

The film may be guided in other ways. For example, the lower pinch rollers 13, 14, 15, 16 may be provided with shoulders, or may be made of resilient material. They could project beyond the edge of the film to make contact with the respective driving rollers to provide a better drive.

While a rotating solenoid 57 has been described, it is possible to have other actuators, for example, hydraulic actuators, pneumatic actuators, or actuators of the electrostatic kind. When it is desired to have a longer film with more images on it, it is advisable to have a loop in the path of the film as an intermediate link, provided with a second drive mechanism to deal with the inertia of the larger spool required.

The timing marks could also be sensed in the object plane instead of the image plane, but then the track would have to be wider in order to allow space for the sensing photocells. In this case twice as many photocells would be required. When there is insufficient light available to operate normal photocells, a photomultiplier tube can be used instead of photocells. This contingency could arise when an incandescent light source is used instead of the mercury vapour light source 51 hereinabove described, or when a Xenon arc is used. Instead of one light source several light sources may be employed.

In the optical system it is possible, instead of having two lenses 31, to use only one lens by arranging the single lens to look at two objects, while the shuttering arrangements can, of course, be positioned elsewhere in the optical path. Other ways of avoiding cross-talk in the sensing photocells may also be taken advantage of.

With regard to the sequence of operations, instead of having these initiated by a master timing pulse from an electrical clock as hereinbefore described, a fresh sequence of operations can also be started by a mark corresponding to the end of the previous form just scanned.

What we claim is:

1. Apparatus for gaining access by optical means to predetermined data stored on a film strip through which light is transmitted, said film strip also including coarse and fine position distinguishing marks correlated to the location on the data stored on said film strip, which comprises a guide track for supporting said film strip for movement longitudinally of itself past a film gate, an aperture plate located at said film gate, said aperture plate including an elongated projection slit extending transverse to the direction of movement of said film strip and across which slit the stored data is passed for printing, said aperture plate being also provided with coarse and fine apertures laterally offset from said projection slit and adapted to register with the coarse and fine position distinguishing marks on said film strip, three sets of friction drive means located in longitudinally spaced relation along said guide track for transporting said film strip past said film gate, each said drive means comprising a drive roller located at one side of said film strip, a pinch roller located at the opposite side of said film strip and means for shifting said pinch roller from a retracted position to an advanced position wherein the film strip is pinched between the two rollers and thereby frictionally driven, a first one of said friction drive means being operated at a fast speed and controlled by the coarse position distinguishing marks on said film strip, a second one of said friction drive means being operated at a slower speed and being controlled by the fine position distinguishing marks on said film strip, and the third friction drive means being thereafter operated at an even slower speed for the purpose of scanning the stored data on said film strip.

2. Apparatus as defined in claim 1 for gaining access to predetermined data stored on a film strip and which further includes three more sets of frictional drive means each as defined in claim 1 and correlated to said film strip at the opposite side of said film gate for transporting said film strip in the opposite direction along said trackway.

3. Apparatus as defined in claim 1 for gaining access to predetermined data stored on a film strip wherein said three sets of frictional drive means correlated to said film strip for driving the same at different speeds are so located in relation to each other that the film strip is transported out of contact with the rollers belonging to said third frictional drive for scanning the stored data when either of said first and second frictional drive means is operating to transport the film strip.

4. Apparatus as defined in claim 1 for gaining access to predetermined data stored on a film strip and which further includes means for alternatively applying air pressure or suction to said film strip at said film gate, air pressure being applied whenever said first friction drive means is operating thereby to establish an air bearing on which the film strip is transported at a fast speed and out-of-contact with said aperture plate and gate, and air suction being applied whenever said second or said third friction drive means is being operated to transport the film strip at slower speeds.

References Cited by the Examiner

UNITED STATES PATENTS

| | | | |
|---|---|---|---|
| 2,271,330 | 9/1939 | Bryce | 88—24 |
| 2,741,960 | 4/1956 | Oldenbloom | 95—1.7 |

NORTON ANSHER, *Primary Examiner.*

R. A. WINTERCORN, *Assistant Examiner.*